United States Patent

[11] 3,540,690

| | | | | |
|---|---|---|---|---|
| [72] | Inventor | Lewis E. Brown Marshalltown, Iowa | | |
| [21] | Appl. No. | 765,248 | | |
| [22] | Filed | Oct. 4, 1968 | | |
| [45] | Patented | Nov. 17, 1970 | | |
| [73] | Assignee | Fisher Governor Company a corporation of Iowa | | |

[54] VALVE CONSTRUCTION
2 Claims, 2 Drawing Figs.

[52] U.S. Cl.................................................. 251/28, 137/458, 137/492.5
[51] Int. Cl.................................................. F16k 31/12
[50] Field of Search............................. 137/116.3, 116.5, 498, 488, 489.5, 491, 492.5; 251/28

[56] References Cited
UNITED STATES PATENTS

| | | | |
|---|---|---|---|
| 2,566,774 | 9/1951 | Otis................... | 137/491X |
| 3,077,898 | 2/1963 | Raymond............ | 137/491 |
| 3,232,174 | 2/1966 | Grimmer............ | 137/458X |
| 3,389,718 | 6/1968 | Johnson............. | 137/458X |

Primary Examiner—Harold W. Weakley
Attorney—Molinare, Allegretti, Newett & Witcoff ABSTRACT: A high and low pressure shutoff valve assembly including a valve plug responsive to control means including a small and a large piston coupled together, with control pressure applied therebetween. If the control pressure exceeds or falls below predetermined values, the small piston will be moved to permit a ball value to close. Continued movement of the small piston away from the ball valve after the ball valve contacts its seat will enable pressure to be vented from one side of the actuator means for the valve plug to permit closure of the valve plug.

Patented Nov. 17, 1970
3,540,690
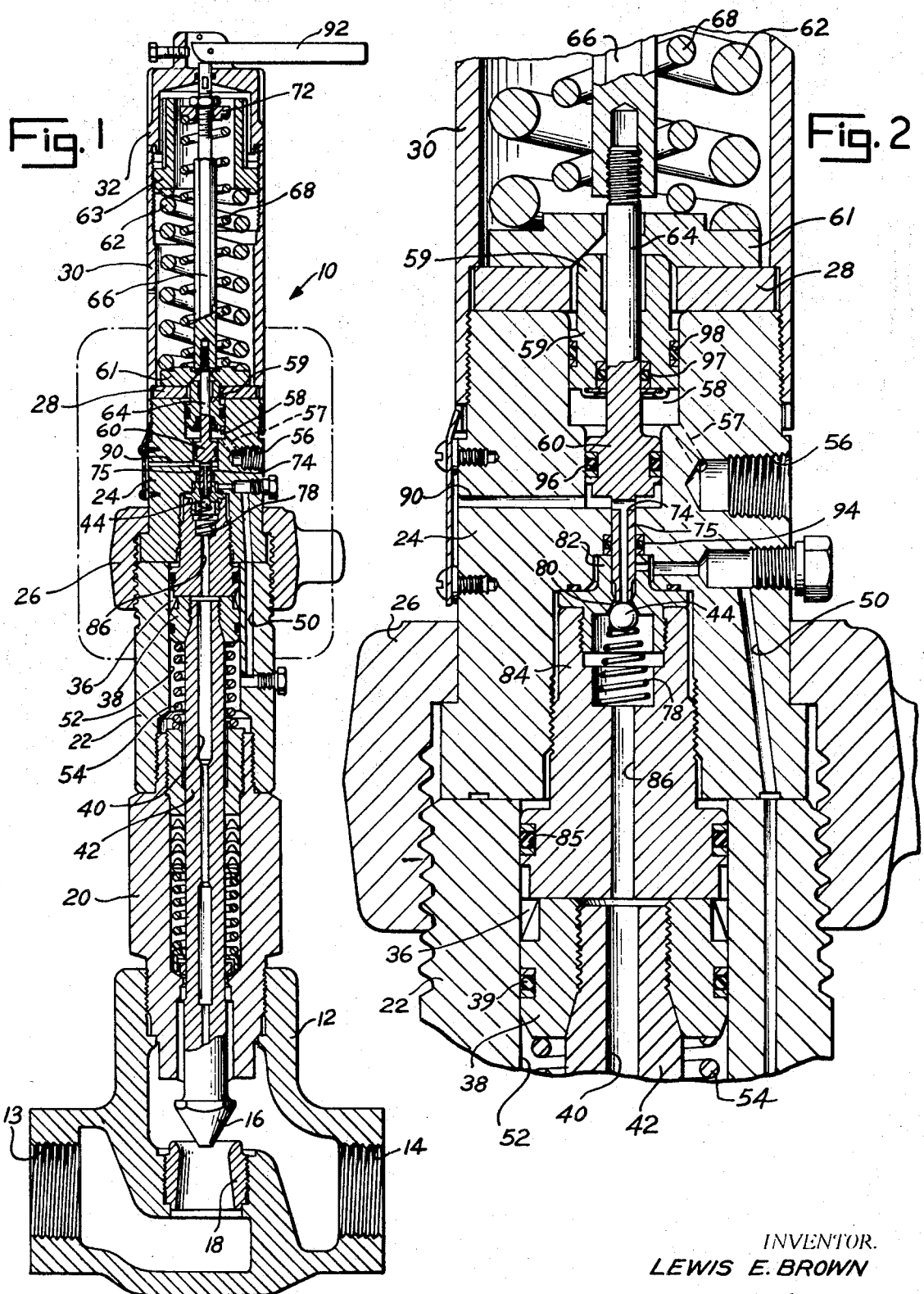
INVENTOR.
LEWIS E. BROWN
BY
Bair, Freeman & Molinare
ATTORNEYS

3,540,690

VALVE CONSTRUCTION

BACKGROUND OF THE INVENTION

This invention relates to an improved shutoff valve assembly for closing a flow line whenever the magnitude of a control pressure exceeds or falls below predetermined high and low values.

Safety valves capable of automatically shutting off a flow line whenever an existing pipeline pressure falls below or rises above a predetermined range of values are useful in a variety of applications, for example, it is often desirable to shut off the fluid flow from a well at the well head level whenever for some reason pressure within an associated pipeline departs from a predetermined acceptable range. A type of valve to which the present invention is applicable is shown in U.S. Pat. No. 3,389,718, granted June 25, 1968, in the names of Cecil M. Johnson and Shelby E. Ross, and assigned to the same assignee as the present case.

The shutoff valve disclosed in U.S. Pat. No. 3,389,718 includes a large and a small piston which are positioned in spaced apart relation from one another within large and small axially aligned bores in a housing. Control pressure is applied to the junction between the two bores such that it tends to force the two pistons apart. Means are employed for biasing the larger piston against the control pressure while the smaller piston is spring loaded with respect to the larger piston against the control pressure. The small and larger pistons are coupled together such that the small piston is carried in a first direction whenever the larger piston moves in that direction while at the same time the small piston is capable of moving in the first direction independently of the larger piston. When the control pressure applied to the two pistons either rises above or falls below a predetermined range of values, the smaller piston is caused to move in the first direction. Three-way valve means responsive to the movement of the small piston in the first direction function to permit actuation of the shutoff valve to terminate the flow of fluid through the valve.

It has been found that the high and low pressure well head shut-in valve as disclosed in U.S. Pat. No. 3,389,718 can fail to function under extremely high pressures (approximately 3000 p.s.i. and greater) when, after an initial high trip has taken place, and the sensed pressure builds back rapidly to reset the control, an unbalanced condition can exist on the three-way valve means, holding it down and wide open. This occurs because the pressure in the chamber around the lower portion of the three-way pilot valve is fully restored, creating a full pressure differential across the lower seal disposed about the three-way valve before it creates the full pressure differential across the upper seal around the three-way pilot valve stem and forces the three-way pilot valve away from the smaller piston. The exhaust path then created prevents any increase in upward force from the unbalance across the upper stem seal and the valve seat for the three-way pilot valve. This allows the three-way pilot valve to be held away from the large and small pistons and prevents any effective control of the main valve.

An object of the present invention is to provide an improved shutoff valve assembly having valve means therein which will function under extremely high pressures.

Another object of the present invention is to provide an improved shutoff valve assembly incorporating control means utilizing a ball valve, such valve assembly overcoming the disadvantages and deficiencies of prior constructions.

Other objects and advantages of present invention will become more apparent hereinafter.

BRIEF DESCRIPTION OF THE DRAWING

The objects and advantages of the present invention will be made most manifest and particularly pointed out in clear, concise and exact terms in conjunction with the accompanying drawing wherein:

FIG. 1 is a cross-sectional drawing of an automatic pressure responsive shutoff valve assembly embodying the principles of the present invention; and FIG. 2 is an enlarged detail view better illustrating the details of the central portion of the valve assembly as shown in FIG. 1.

DETAILED DESCRIPTION OF THE INVENTION

Referring to FIG. 1 there is shown a high and low pressure well head shut-in valve assembly 10 embodying the present invention. The shut-in valve assembly 10 includes at the lower end thereof a main valve body 12 provided with threaded ports 13 and 14 which are adapted to be connected to the flow line being controlled. The valve plug 16 is adapted to engage with a tubular valve seat 18 disposed in the valve body 12.

The components of the high and low pressure control means for the valve plug 16 are enclosed within housing means connected to the valve body 12. Such housing means may comprise a tubular housing or bonnet 20 threadedly connected at its lower end to the valve body 12, a tubular body 22 threadedly connected to the bonnet 20, and a body 24 which is connected to the body 24 by means of a lock nut 26. A shoulder plate or stop plate 28 rests against the upper surface of the body 24 and is retained in place by a spring case 30 which is threadedly engaged with the body 24. The upper end of the spring case 30 is closed by a cover cap 32 which completes the exterior housing means for the overall valve assembly.

As shown in FIG. 1, the main shutoff valve or valve plug 16 is opened to permit fluid flow through the valve body 12 when the device is operating within the desired predetermined pressure range. The pressure responsive valve actuating means for operating the valve plug 16 is housed within the housing means which encompasses the components 20, 22, 24, 30, 32. Valve plug 16 is formed at the end of valve plug stem 42 which has an actuator piston 38 at the end thereof opposite the valve plug. Line pressure is communicated into the chamber 36 above the actuator piston 38 by means of a bore or passage 40 defined within the valve plug stem 42. If the valve means indicated generally at 44 is open, line pressure will pass into passage 50 and through passage 50 in the bodies 22 and 24 into chamber 52 below the actuator piston 38. While normal pressure conditions exist in the system, the actuator piston 38 is pressure balanced and the spring 54 disposed about the stem 42 of the valve plug 16 biases the valve plug 16 open as seen in FIG. 1. Seal 39 is provided on the activator piston 38 to seal between the piston and the interior wall of bonnet 22.

The sensed pressure or control pressure which controls the operation of the valve assembly is applied through pressure port 56 to a control chamber 58 via a passage 57 in body or housing portion 24. The pressure port 56 is adapted to be connected to a suitable pressure line. The control pressure is preferably from the system being controlled, for example, system pressure downstream from the valve 10, however, it may be from a separate source. The control pressure within chamber 58 is applied to both a large piston 59 and a small piston 60 and tends to force the two pistons apart. The larger or high pressure piston 59 is normally urged by the pressure in chamber 58 against an annular shoulder or abutment member 61 in the housing 30. A first compression spring 62 is disposed between member 61 and member 63. The upper spring stop or retainer member 63 is adjustably supported in spring case 30. The inner spring 62 biases the smaller piston 59 with respect to the larger piston 60 against the control pressure in chamber 58.

The smaller or low pressure piston 60 is provided with a shank or elongated stem 64 which extends upwardly through the annular piston 59 and is connected to a stem 66. Compression spring 68 is employed to spring load the small piston 60 with respect to the larger piston 59 against the pressure within the control chamber 58. The compression springs 62 and 68 bear at their upper ends against abutment members 63 and 72 respectively. The abutment member 63 is threadedly engaged to the spring cover 30 and may be moved axially to adjust the desired compression for the spring 62 while the member 72 is threadedly affixed on the threaded end of the stem 64 and may be adjusted thereon to select the desired compression for the inner spring 68. The smaller piston 60 is movable in a first direction or upwardly as seen in FIGS. 1 and 2 independent of the movement of the larger piston 59.

Upward movement of the smaller piston 60 will result in closure of the valve plug 16 against the valve seat 18. When the small piston 60 is in its full downward position, the lower valve stem end portion 75 of piston 60 engages the ball valve 44 and closes the passage 74 through the valve stem and portion 75 of small piston 60. The compression spring 78 biases the ball valve 44 upward towards engagement with its seat and towards engagement with the lower end of the valve stem 75 In the position shown in FIG. 2, for example, the ball valve 44 is seated against the valve seat 80 defined in the seat member 82. The seat member 82 is threadedly engaged within the end of the block member 84 and the block member is, in turn, threadedly engaged within the body portion 24. A seal 85 is provided between the body portion 84 and the body portion 22.

Valve means 44 controls the pressure in the chamber 52 below the piston actuator 38. When the small piston 60 moves downward, the valve stem 75 fixed to piston 60 also moves downward, in turn moving the valve 44 downwardly away from the valve seat 80. Line pressure fluid may flow upwardly through the passage 40 in the valve stem 42 through the opening 86 in the block member 84 and passage 50 to the chamber 52 below the actuator piston 38. The actuator piston 38 will be moved upwardly by spring 54 toward engagement with block member 84, so as to move the valve plug 16 away from the valve seat 18 and permit the flow of fluid through the passageway in the valve body 12. During normal operation, the valve plug 16 will be open.

Suitable seal means 94 are provided between the valve stem portion 75 of piston 60 and the body 24. Seal 96 is disposed on the small piston 60 for sealing between the piston and body 24. Seals 97 and 98 are disposed between the stem 64 of the small piston 60 and the large piston 59 and between the large piston 59 and body 24, respectively.

When the control pressure goes below the low pressure setting as determined by the inner spring 68, the spring 68 urges the stems 66 and 64 and small piston 60 secured thereto upwardly. The ball valve 44 is then seated against the valve seat 80 and line pressure is sealed off from the underside of the actuator piston 38, that is, no flow of line fluid is permitted from the passage 40 within the valve stem 42, through the passage 86 in block member 84, passage 50 in body portions 24, 22 to the underside of the actuator piston 38. Further travel of the low pressure piston or small piston 60 upwardly away from the ball valve 44 permits unseating of the lower end of hollow stem 75 of the small piston 60 from the ball valve 44 and allows the pressure from the underside of the actuator piston 38 to be vented through passage 50 and bleed passage 90. As shown, the pressure is vented to the atmosphere. Line pressure delivered to the chamber 36 above the actuator piston 38 through passage 40 will force the piston 38 and valve plug 16 downwardly against seat 18 to close the flow path through the valve body 12

When the control pressure exceeds a predetermined high value or goes above the high pressure setting of the actuating means as determined by the setting of the spring 62, the spring 62 is compressed and the high and low pressure pistons or the larger and smaller pistons 59 and 60, respectively, travel upwardly. This movement of the piston 60 upwardly again seals the ball valve 44 against the ball valve seat 80 to prevent the passage of line pressure from the valve body 12 to the underside of the actuator piston 38. Further upward movement of the small piston 60 will unseat the hollow stem 75 of the low pressure piston or small piston 60 and allow the pressure from the chamber 52 to bleed to the atmosphere through the passages 50 and 90, thus allowing the line pressure in the chamber 36 above actuator piston 38 to urge the actuator piston downwardly against the bias of spring 54 and close the valve plug 16 against the seat 18.

A pivoted lever 92 is provided on the top of cap member 32 to permit selective actuation of the stem 66 and the small piston 60 secured thereto. In the event of freezeup, which might occur in some circumstances, the ball valve 44 may be moved away from the seat 80 or freed from the seat 80, so as to enable continued operation of the shut-in valve assembly.

By virtue of the present invention, the shut-in valve assembly will operate under extremely high pressures, even after a high trip has taken place and the sensed pressure has built back rapidly to reset the actuating means. The difficult operation sometimes resulting from use of the shut-in valve with the three-way valve as shown in U.S. Pat. No. 3,389,718 is obviated and complete controlled operation over the full operating range is permitted by the present invention. The shutoff valve of the present invention will reliably function over an extended period of time to close the main shutoff valve in the event the control pressure exceeds a predetermined high value or falls below a predetermined low value.

While there has been described and illustrated a preferred embodiment of the invention, it will be understood that the invention is not limited thereto, since it may be otherwise embodied within the scope of the following claims.

I claim:

1. In a pressure responsive shutoff valve assembly including a shutoff valve adapted to stop fluid flow in a flow line in the event a control pressure exceeds or falls below predetermined values, said valve assembly comprising a housing means, first bore means defined in said housing means, second bore means within said housing means axially aligned with said first bore, a first small piston disposed for sliding motion in said first bore means, a second large piston disposed for sliding motion in said second bore means, a control chamber being defined at the intersection of said bores, means for supplying a control pressure to the said control chamber tending to force said pistons apart, means for biasing said large piston in opposition to the force exerted against said large piston by said control pressure, means for biasing said small piston with respect to said large piston against said control pressure, means coupling said pistons for carrying said small piston in a first axial direction whenever said large piston moves in said first axial direction while permitting said small piston to move in said first axial direction independently of said large piston, valve means responsive to the movement of said small piston for opening and closing said shutoff valve, and main actuator means for operating said shutoff valve, said actuator means defining a first chamber and a second chamber in said housing means, means for applying line pressure to said first chamber, the improvement comprising said valve means being a ball valve biased toward a seated position and urged toward open position by the small piston, said small piston including a stem portion operable in conjunction with said ball valve to vent the second chamber to permit closing of the shutoff valve, wherein, with control pressure within a predetermined range of values, the small piston is operative to open the ball valve to permit application of upstream pressure to the second chamber and against the actuator means to open the shutoff valve and if the control pressure rises above or falls below the predetermined range of values, the small piston will move in said first axial direction to permit closure of the ball valve and wherein continued movement of said small piston in said first axial direction after closure of the ball valve will permit venting of pressure from the second chamber to permit closing of the shutoff valve, said stem portion having a flow passage therethrough, said stem portion having an end engageable with the ball valve to close the flow passage, with movement of the stem portion in a direction opposite said first axial direction opening said ball valve and with movement of said stem portion in said first axial direction permitting closure of said ball valve, and after said ball valve is closed, continued movement of the stem portion will separate the stem portion from the ball valve and open the flow passage to vent the second chamber.

2. A pressure responsive shutoff valve assembly as in claim 1 including a seat member in said housing means having an opening therethrough, said ball valve seating against said seat member to close said opening.